(12) United States Patent
Risse (10) Patent No.: US 7,899,984 B2
(45) Date of Patent: Mar. 1, 2011

(54) MEMORY MODULE SYSTEM AND METHOD FOR OPERATING A MEMORY MODULE

(75) Inventor: Gerhard Risse, Munich (DE)

(73) Assignee: Qimonda AG, Munich (DE)

( * ) Notice: Subject to any disclaimer, the term of this patent is extended or adjusted under 35 U.S.C. 154(b) by 340 days.

(21) Appl. No.: 11/860,747

(22) Filed: Sep. 25, 2007

(65) Prior Publication Data

US 2008/0077732 A1    Mar. 27, 2008

(30) Foreign Application Priority Data

Sep. 25, 2006    (DE) .................. 10 2006 045 113

(51) Int. Cl.
*G06F 12/00* (2006.01)
(52) U.S. Cl. ................ 711/105; 711/5; 711/114; 711/170; 711/E12.001
(58) Field of Classification Search .............. None
See application file for complete search history.

(56) References Cited

U.S. PATENT DOCUMENTS

2003/0061447 A1    3/2003    Perego et al.
2004/0250024 A1*   12/2004   Vogt ......................... 711/131

FOREIGN PATENT DOCUMENTS

WO    2004109500 A2    12/2004

* cited by examiner

*Primary Examiner*—Shawn X Gu
(74) *Attorney, Agent, or Firm*—Dicke, Billig & Czaja, PLLC (57) ABSTRACT

A memory module system, a memory module, a buffer device, a memory module printed circuit board, and to a method for operating a memory module is disclosed. In one embodiment, the memory module system includes at least a first, a second, and a third memory module. The first memory module is connected with the second memory module via a first connection and with the third memory module via a second connection, and is designed and equipped such that data, address, and/or control signals received by the first memory module are transmitted to the second memory module via the first connection and to the third memory module via the second connection.

21 Claims, 4 Drawing Sheets

MEMORY MODULE SYSTEM AND METHOD FOR OPERATING A MEMORY MODULE

CROSS-REFERENCE TO RELATED APPLICATIONS

This Utility Patent Application claims priority to German Patent Application No. DE 10 2006 045 113.9 filed on Sep. 25, 2006, which is incorporated herein by reference.

BACKGROUND

The invention relates to a memory module system, a memory module, a buffer device, a memory module printed circuit board, and to a method for operating a memory module.

Conventional computers, e.g., PCs (Personal Computer), laptops, notebooks, workstation computers, server computers, etc. include in general a main printed circuit board, the motherboard, on which one or a plurality of CPUs may be provided, as well as one or a plurality of memory controllers, and one or a plurality of plug contacts for memory modules, etc.

The different components of the motherboard, e.g., the above-mentioned memory modules, the CPU, the memory controller, etc. may—for the exchange of corresponding data, address, and/or control signals—be connected with each other via one or a plurality of bus systems.

As memory modules—to be plugged into the above-mentioned memory plug contacts—appropriate SIMM or DIMM memory cards may, for instance, be used (SIMM=Single In-Line Memory Module, DIMM=Dual In-Line Memory Module) which each include a plurality of memory devices, e.g., a plurality of RAM memory devices, in one embodiment SRAMs or DRAMs (SRAM=Static Random Access Memory; DRAM=Dynamic Random Access Memory).

In a plurality of applications—in one embodiment e.g., with server or workstation computers, etc. —memory modules with upstream data buffer elements (buffers), e.g., "buffered DIMMs", "FB-DIMMs" (FB-DIMM=Fully Buffered DIMM), etc. may also be used instead of the above-mentioned memory modules. In the case of conventional memory module systems, a plurality of such buffered DIMMs, FB-DIMMs, etc. may be connected in series in the form of a corresponding "daisy chain".

One of the disadvantages of conventional memory module systems are the relatively high delay or latency times caused by the "daisy chain" that includes often relatively long, i.e. relatively many links or memory modules.

For these and other reasons, there is a need for the present invention.

SUMMARY OF THE INVENTION

One embodiment provides a memory module system including at least a first memory module, a second memory module, and a third memory module, wherein the first memory module is connected with the second memory module via a first connection and with the third memory module via a second connection, and is configured such that data, address, and/or control signals received by the first memory module from a memory controller via a controller connection are transmitted from the first memory module to the second memory module via the first connection and from the first memory module to the third memory module via the second connection.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

One or more embodiments provide a novel memory module system, a novel memory module, a novel buffer device, a novel memory module printed circuit board, and a novel method for operating a memory module.

In accordance with one embodiment, there is provided a memory module system that includes at least a first, a second, and a third memory module, wherein the first memory module is connected with the second memory module via a first connection and with the third memory module via a second connection, and is designed and equipped such that data, address, and/or control signals received by the first memory module are transmitted to the second memory module via the first connection and to the third memory module via the second connection.

In one embodiment, the memory module system includes a fourth and a fifth memory module, wherein the second memory module is connected with the fourth memory module via a third connection and with the fifth memory module via a fourth connection, and is designed and equipped such that data, address, and/or control signals received by the second memory module via the first connection are transmitted to the fourth memory module via the third connection and to the fifth memory module via the fourth connection, etc., etc.

By the "tree" structure of memory modules which is generated this way, minor signal delay or latency times can be achieved vis-à-vis a daisy chain structure.

Figure 1:
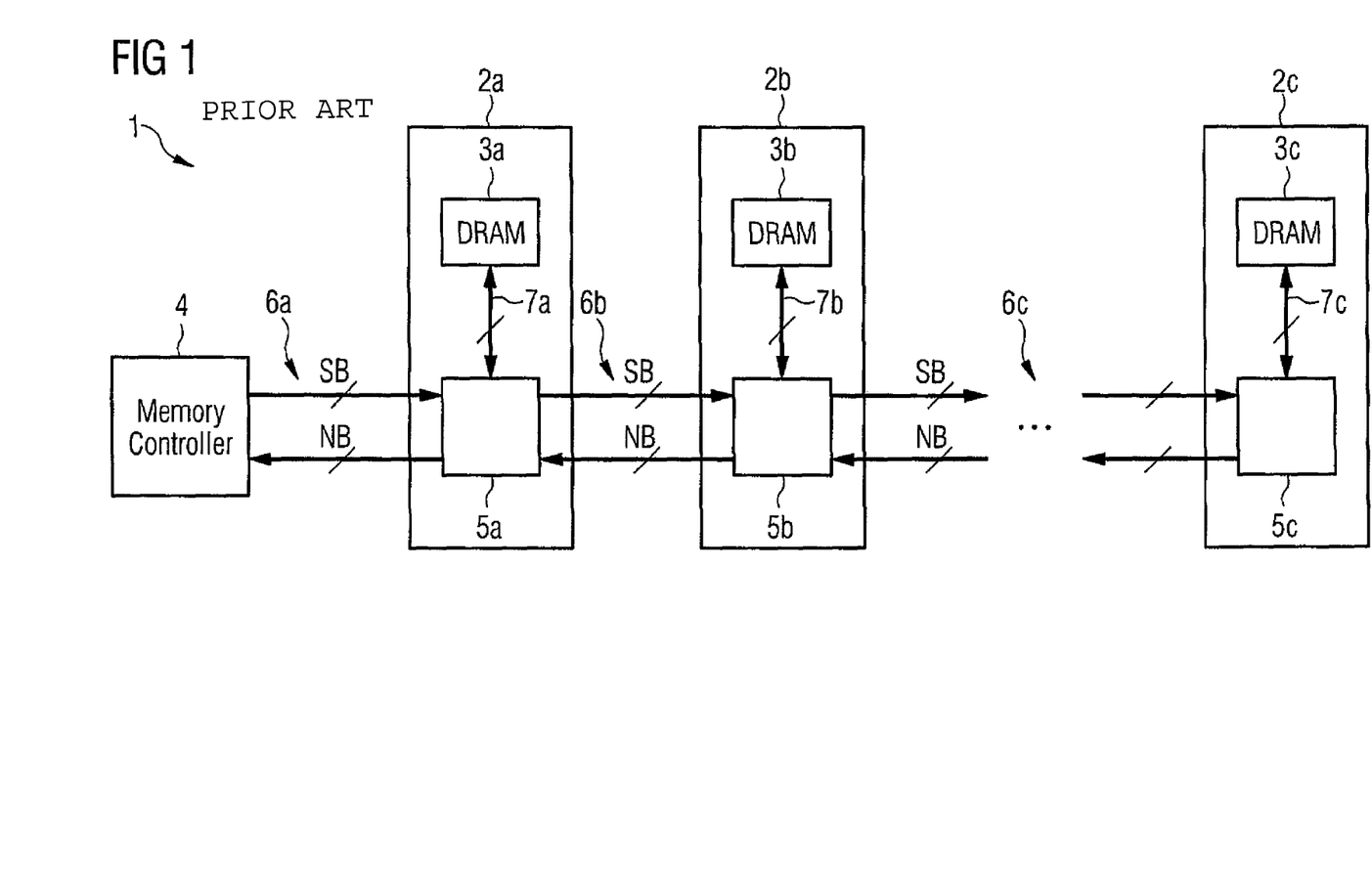
FIG. 1 illustrates a schematic representation of a conventional memory module system.

FIG. 1 illustrates by way of example a conventional memory module system 1 with FB-DIMMs 2a, 2b, 2c. In the system 1 illustrated in FIG. 1, up to eight memory modules/ FB-DIMMs 2a, 2b, 2c per channel can be connected to a corresponding CPU or memory controller 4, respectively.

Each memory module/FB-DIMM 2a, 2b, 2c includes a data buffer device (buffer) 5a, 5b, 5c, and a plurality of DRAMs 3a, 3b, 3c, e.g., DDR2-DRAMs (for reasons of better presentability, only one DRAM 3a, 3b, 3c per FB-DIMM 2a, 2b, 2c is illustrated in FIG. 1).

The FB-DIMMs 2a, 2b, 2c may be plugged into appropriate memory plug contacts of a motherboard which, for instance, also includes the above-mentioned CPU or memory controller 4, respectively.

As results from FIG. 1, the CPU/memory controller 4 is connected to the first FB-DIMM 2a (more exactly: its buffer 5a) via a first bus 6a which includes a first channel ("south-bound channel" (SB channel)) and a second channel ("north-bound channel" (NB channel)). The SB channel of the bus 6a is used to send corresponding address, control, and data signals from the CPU/memory controller 4 to the first FB-DIMM 2a. In one embodiment, the NB channel of the bus 6a is used to send corresponding signals from the first FB-DIMM 2a to the CPU/memory controller 4.

As results further from FIG. 1, the first FB-DIMM 2a (more exactly: its buffer 5a) is connected to the second FB-DIMM 2b (more exactly: its buffer 5b) via a second bus 6b which includes, like the first bus 6a, a first channel ("south-bound channel" (SB channel)) and a second channel ("north-bound channel" (NB channel)). In one embodiment, the second FB-DIMM 2b (more exactly: its buffer 5b) is connected to a third FB-DIMM (more exactly: its buffer) via a third bus 6c (which also includes a first channel ("south-bound channel" (SB channel)) and a second channel ("north-bound channel" (NB channel)), etc., etc.

The FB-DIMMs 2a, 2b, 2c operate corresponding to the "daisy chain" principle:

The buffer 5a of the first FB-DIMM 2a (i.e. the first link of the "daisy chain") transmits corresponding data, address, and/or control signals sent from the CPU/memory controller 4 via the "south-bound channel" of the first bus 6a to the first FB-DIMM 2a—irrespective of whether the first FB-DIMM 2a or another FB-DIMM is addressed with the signals—via the "south-bound channel" of the second bus 6b to the buffer 5b of the second FB-DIMM 2b (i.e. the second link of the "daisy chain").

In one embodiment, the buffer 5b of the second FB-DIMM 2b transmits the corresponding data, address, and/or control signals received from the buffer 5a of the first FB-DIMM 2a-irrespective of whether the second FB-DIMM 2b or another FB-DIMM is addressed with the signals—via the "south-bound channel" of the third bus 6c to the buffer of the third FB-DIMM (i.e. the third link of the daisy chain), etc.

In one embodiment, the buffer 5b of the second FB-DIMM 2b transmits corresponding signals received from the buffer of the third FB-DIMM via the "north-bound channel" of the third bus 6c to the buffer 5a of the first FB-DIMM 2a via the "north-bound channel" of the second bus 6b.

The buffer 5a of the first FB-DIMM 2a transmits—in one embodiment—the corresponding signals received from the buffer 5b of the second FB-DIMM 2b via the "north-bound channel" of the second bus 6b to the CPU/memory controller 4 via the "north-bound channel" of the first bus 6a.

As is further illustrated in FIG. 1, every DRAM 3a, 3b, 3c is, via a corresponding bus 7a, 7b, 7c, connected to the corresponding buffer 5a, 5b, 5c of the respective FB-DIMM 2a, 2b, 2c.

Every buffer 5a, 5b, 5c knows its position in the (daisy) chain. Which of the FB-DIMMs 2a, 2b, 2c is just being addressed by the CPU/memory controller 4, may be determined in the respective buffer 5a, 5b, 5c e.g., by comparing identification data (ID number or slot number) stored in the corresponding buffer 5a, 5b, 5c with identification data sent by the CPU/memory controller 4 via the busses 6a, 6b, 6c and individually characterizing the respective buffer.

The buffer of a respectively addressed FB-DIMM transmits the data, address, and/or control signals received via a corresponding "south-bound channel" of one of the busses 6a, 6b, 6c not just, as described above, to the respectively next link of the above-mentioned "daisy chain" (i.e. to the buffer that follows next in the "daisy chain"), but—possibly in a converted form—via the respective bus 7a, 7b, 7c also to the DRAMs 3a, 3b, 3c of the respectively addressed FB-DIMM 2a, 2b, 2c. Furthermore, signals received by a corresponding buffer 5a, 5b, 5c via the respective bus 7a, 7b, 7c from an addressed DRAM are—possibly in a converted form—transmitted from the respective buffer 5a, 5b, 5c via a corresponding "north-bound channel" of one of the busses 6a, 6b, 6c to the respectively preceding link of the above-mentioned "daisy chain" (i.e. to the buffer that precedes in the "daisy chain", or—from the buffer 5a of the first FB-DIMM—to the CPU/memory controller 4).

Figure 2:
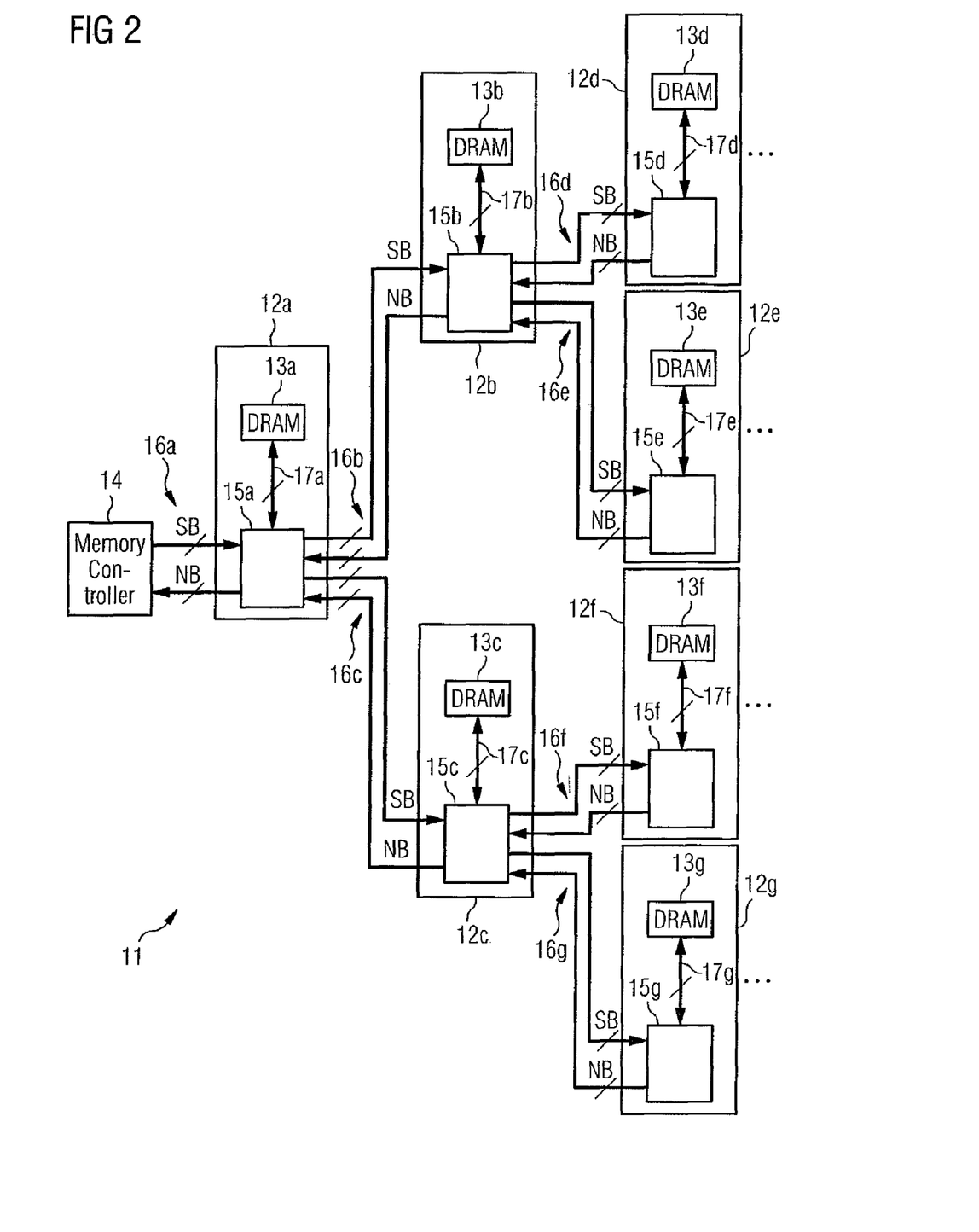
FIG. 2 illustrates a schematic representation of a memory module system according to one embodiment.

FIG. 2 illustrates by way of example a schematic representation of a memory module system 11 in accordance with one embodiment. As results from FIG. 2 and from the explanations below, up to seven memory modules or memory cards 12a, 12b, 12c, 12d, 12e, 12f, 12g (in one embodiment DIMMs 12a, 12b, 12c, 12d, 12e, 12f, 12g (DIMM=Dual In-Line Memory Module)) per channel may be connected to a corresponding CPU or memory controller 14 in the memory module system 11 (or—as will be explained in more detail further below—in alternative embodiments e.g., up to fifteen, or up to thirty-one memory modules/DIMMs per channel, etc., etc.).

Via a corresponding bus (not illustrated), the memory controller 14 may be connected to one or a plurality of CPUs, or may also be part of a corresponding CPU, i.e. be provided on the same chip as the CPU.

For reasons of simpler presentability, only one single channel is illustrated in FIG. 2. The memory module system 11 may includes more channels than the channel illustrated in FIG. 2, e.g., more than two or four channels, wherein each channel—like the channel illustrated in FIG. 2—may, for instance, include up to seven (or alternatively up to fifteen, or up to thirty-one, etc.) memory modules or memory cards 12a, 12b, 12c, 12d, 12e, 12f, 12g.

As results from FIG. 2, each memory module/DIMM 12a, 12b, 12c, 12d, 12e, 12f, 12g includes a data buffer device (buffer) 15a, 15b, 15c, 15d, 15e, 15f, 15g (or alternatively e.g., more than one, e.g., two buffers) and one or a plurality of memory devices, e.g., a plurality of RAM memory devices, in one embodiment a plurality of SRAMs or DRAMs, e.g., more than three, seven, or fifteen, for instance, eight or sixteen DRAMs, in one embodiment DDR2 or DDR3-DRAMs (for reasons of easier presentability, only one DRAM 13a, 13b, 13c, 13d, 13e, 13f, 13g each per DIMM 12a, 12b, 12c, 12d, 12e, 12f, 12g is illustrated in FIG. 2).

Every DRAM 13a, 13b, 13c, 13d, 13e, 13f, 13g may, for instance, have a memory capacity of e.g., 128 Mbit, 256 Mbit, 1 Gbit, 2 Gbit, etc. (or more).

The total memory capacity provided by a DIMM 12a, 12b, 12c, 12d, 12e, 12f, 12g depends on the number of DRAMs 13a, 13b, 13c, 13d, 13e, 13f, 13g provided on a DIMM 12a, 12b, 12c, 12d, 12e, 12f, 12g, and on the memory capacity of the individual DRAMs 13a, 13b, 13c, 13d, 13e, 13f, 13g, and may, for instance, be 1 Gbyte, 2 Gbyte, etc. (or more).

The DIMMs 12a, 12b, 12c, 12d, 12e, 12f, 12g may be plugged into corresponding memory plug contacts of a motherboard which, for instance, also includes the above-mentioned CPU(s) and/or the above-mentioned memory controller 14.

As results from FIG. 2, the CPU/memory controller 14 is—like in conventional memory module systems—connected to the first DIMM 12a (more exactly: its buffer 15a) via a first, separate bus 16a which includes a first channel ("south-bound channel" (SB channel)) and a second channel ("north-bound channel" (NB channel)). The SB channel of the bus 16a is—like in conventional memory module systems—used to send corresponding address, control, and data signals from the CPU/memory controller 14 to the first DIMM 12a. In one embodiment, the NB channel of the bus 16a is used to send corresponding signals from the first DIMM 12a to the CPU/memory controller 14.

As results further from FIG. 2, the first DIMM 12a (more exactly: its buffer 15a) is—other than in conventional memory module systems—connected via a second, separate bus 16b to the second DIMM 12b (more exactly: its buffer 15b), and additionally via a third, separate bus 16c to the third DIMM 12c (more exactly: its buffer 15c).

The second and the third busses 16b, 16c comprise, like the first bus 16a, each a first channel ("south-bound channel" (SB channel)) and a second channel ("north-bound channel" (NB channel)).

As results further from FIG. 2, the second DIMM 12b (more exactly: its buffer 15b) is—other than in conventional memory module systems—via a fourth, separate bus 16d connected to the fourth DIMM 12d (more exactly: its buffer 15d), and additionally via a fifth, separate bus 16e to the fifth DIMM 12e (more exactly: its buffer 15e).

The fourth and fifth busses 16d, 16e comprise, like the first, second, and third busses 16a, 16b, 16c, each a first channel ("south-bound channel" (SB channel)) and a second channel ("north-bound channel" (NB channel)).

In one embodiment to the second DIMM 12b (more exactly: its buffer 15b), the third DIMM 12c (more exactly: its buffer 15c) is also—other than in conventional memory module systems—via a sixth, separate bus 16f connected to the sixth DIMM 12f (more exactly: its buffer 15f), and additionally via a seventh, separate bus 16g to the seventh DIMM 12g (more exactly: its buffer 15g), wherein the sixth and seventh busses 16f, 16g comprise, like the busses 16a, 16b, 16c, 16d, 16e, each a first channel ("south-bound channel" (SB channel)) and a second channel ("north-bound channel" (NB channel)).

In one or more embodiments, the fourth, and/or fifth, and/or sixth, and/or seventh DIMMs 12d, 12e, 12f, 12g may be connected via corresponding further busses each to two further DIMMs (and the further DIMMs in turn to respectively two additional DIMMs, etc.), so that, as already mentioned above, instead of—as illustrated in FIG. 2—up to seven, e.g., up to fifteen, or up to thirty-one memory modules/DIMMs, etc. per channel may be connected to the memory module system 11.

As results from the above explanations, the DIMMs 12a, 12b, 12c, 12d, 12e, 12f, 12g are—other than in conventional memory module systems—not arranged in a "daisy chain" structure, but in a "tree" or "pyramid" structure.

For generating the above-mentioned "tree" or "pyramid" structure, the buffers 15a, 15b, 15c, 15d, 15e, 15f, 15g provided on the DIMMs 12a, 12b, 12c, 12d, 12e, 12f, 12g include—other than in conventional memory module systems—not each two, but each three interface circuits (e.g., the buffer 15b a first interface circuit (primary interface circuit) for connection to the bus 16b, a second interface circuit (first secondary interface circuit) for connection to the bus 16d, and—other than conventional buffers—a third interface circuit (second secondary interface circuit) for connection to the bus 16e).

As to the "south-bound channels" of the above-mentioned busses 16a, 16b, 16c, 16d, 16e, 16f, 16g, the memory module system 11 illustrated in FIG. 2 may, for instance, operate as follows:

The buffer 15a of the first DIMM 12a (i.e. the buffer 15a arranged in a first logic level of the above-mentioned "tree" structure) transmits corresponding data, address, and/or control signals sent from the CPU/memory controller 14 via the "south-bound channel" of the first bus 16a to the first DIMM 12a or the buffer 15a, respectively—irrespective of whether the first DIMM 12a or another DIMM is addressed with the signals (and possibly after performing a corresponding signal regeneration)—via the "south-bound channel" of the second bus 16b to the buffer 15b of the second DIMM 12b, and additionally—also irrespective of whether the first DIMM 12a or another DIMM is addressed with the signals (and possibly after performing the above-mentioned signal regeneration)—via the "south-bound channel" of the third bus 16c to the buffer 15c of the third DIMM 12c (i.e. to buffers 15b, 15c arranged in a second logic level of the above-mentioned "tree" structure).

In one embodiment, the buffer 15b of the second DIMM 12b transmits the corresponding data, address, and/or control signals received from the buffer 15a of the first DIMM 12a—irrespective of whether the second DIMM 12b or another DIMM is addressed with the signals (and possibly after performing a corresponding signal regeneration)—via the "south-bound channel" of the fourth bus 16d to the buffer 15d of the fourth DIMM 12d, and additionally also—also irrespective of whether the second DIMM 12b or another DIMM is addressed with the signals (and possibly after performing the above-mentioned signal regeneration)—via the "south-bound channel" of the fifth bus 16e to the buffer 15e of the fifth DIMM 12e (i.e. to buffers 15d, 15e arranged in a third logic level of the above-mentioned "tree" structure), etc.

Similarly, the buffer 15c of the third DIMM 12c transmits the corresponding data, address, and/or control signals received from the buffer 15a of the first DIMM 12a—irrespective of whether the third DIMM 12c or another DIMM is addressed with the signals (and possibly after performing a corresponding signal regeneration)—via the "south-bound channel" of the sixth bus 16f to the buffer 15f of the sixth DIMM 12f, and additionally also—also irrespective of whether the third DIMM 12c or another DIMM is addressed with the signals (and possibly after performing the above-mentioned signal regeneration)—via the "south-bound channel" of the seventh bus 16g to the buffer 15g of the seventh DIMM 12g (i.e. to buffers 15f, 15g that are also arranged in the above-mentioned third logic level of the above-mentioned "tree" structure), etc.

Thus, in the memory module system 11 illustrated in FIG. 2—irrespective of which of the DIMMs 12a, 12b, 12c, 12d, 12e, 12f, 12g is exactly addressed, and of whether a read or a write access is performed—all the "south-bound channels" of the above-mentioned busses 16a, 16b, 16c, 16d, 16e, 16f, 16g are activated during each access.

As to the above-mentioned "north-bound channels" of the above-mentioned busses 16a, 16b, 16c, 16d, 16e, 16f, 16g, the memory module system 11 illustrated in FIG. 2 may, for instance, operate as follows:

The buffer 15b of the second DIMM 12b transmits—if it receives corresponding signals from the buffer 15d of the fourth DIMM 12d via the "north-bound channel" of the fourth bus 16d, or from the buffer 15e of the fifth DIMM 12e via the "north-bound channel" of the fifth bus 16e—the respective signals via the "north-bound channel" of the second bus 16b to the buffer 15a of the first DIMMs. In a first variant of the memory module system 11, the "north-bound channel" of the fourth bus 16d is only activated if the buffer 15d sends corresponding signals to the buffer 15b, and the "north-bound channel" of the fifth bus 16e only if the buffer 15e sends corresponding signals to the buffer 15b—otherwise the "north-bound channels" of the fourth and/or fifth busses 16d, 16e remain in a deactivated state. In an alternative variant of the memory module system 11, a separate activation of the above-mentioned "north-bound channels" of the fourth and fifth busses 16d, 16e may be renounced (or it may not be provided at all by the protocol, i.e. not be possible at all).

In one embodiment, as the buffer 15b of the second DIMM 12b, the buffer 15c of the third DIMM 15c transmits—if it receives corresponding signals from the buffer 15f of the sixth DIMM 12f via the "north-bound channel" of the sixth bus 16f, or from the buffer 15g of the seventh DIMM 12g via the "north-bound channel" of the seventh bus 16g—the respective signals via the "north-bound channel" of the third bus 16c to the buffer 15a of the first DIMM 15a. In the above-mentioned first variant of the memory module system 11, the "north-bound channel" of the sixth bus 16f can only be activated if the buffer 15f sends corresponding signals to the buffer 15c, and the "north-bound channel" of the seventh bus 16g only if the buffer 15g sends corresponding signals to the buffer 15c—otherwise the "north-bound channels" of the sixth and/or seventh busses 16f, 16g remain in a deactivated state. In the above-mentioned alternative variant of the memory module 11, a separate activation of the above-mentioned "north-bound channels" of the sixth and seventh busses 16f, 16g may be renounced.

The buffer 15a of the first DIMM 12a transmits—if it receives corresponding signals from the buffer 15b of the second DIMM 12b via the "north-bound channel" of the second bus 16b, or from the buffer 15c of the third DIMM 12c via the "north-bound channel" of the third bus 16c—the respective signals via the "north-bound channel" of the first bus 16a to the CPU/memory controller 14. In the above-mentioned first variant of the memory module system 11, the "north-bound channel" of the second bus 16b is only activated if the buffer 15b sends corresponding signals to the buffer 15a, and the "north-bound channel" of the third bus 16c only if the buffer 15c sends corresponding signals to the buffer 15a—otherwise the "north-bound channels" of the second and/or third busses 16b, 16c remain in a deactivated state. In the above-mentioned alternative variant of the memory module system 11, a separate activation of the above-mentioned "north-bound channels" of the second and third busses 16b, 16c may be renounced.

Thus, in the memory module system 11 illustrated in FIG. 2, all the respective "north-bound channels" can be activated in the above-mentioned alternative variant—irrespective of the kind of access, or irrespective of which of the DIMMs 12a, 12b, 12c, 12d, 12e, 12f, 12g is exactly addressed. On the other hand, in the above-mentioned first variant of the memory module system 11, one or a plurality of "north-bound channels" of the above-mentioned busses 16a, 16b, 16c, 16d, 16e, 16f, 16g can only be activated during particular accesses, especially during read accesses, and in this case only those respective "north-bound channels" that are positioned between the DIMM to which a read access is performed and the CPU/memory controller 14—during other accesses, in one embodiment during write accesses, all the "north-bound channels" remain in a deactivated state.

Thus, for the memory module system 11 with "tree" structure and seven connected DIMMs 12a, 12b, 12c, 12d, 12e, 12f, 12g illustrated in FIG. 2, in the above-mentioned first variant the average number of activated "north-bound channels" results per read access as $17/7$, i.e.$\approx 2.4$ (wherein it is assumed that a read access relates, with the same probability of $1/7$, to the first, the second, the third, etc. DIMM).

Contrary to this, in the corresponding memory system 1 with "daisy chain" structure illustrated in FIG. 1 (with seven DIMMs connected, too), 28/7, i.e. 4 "north-bound channels" are activated on average per read access (wherein it is again assumed that a read access relates, with the same probability of $1/7$, to the first, the second, the third, etc. DIMM).

Thus, it is possible to reduce the current or power consumption of the memory module system by the "tree" structure illustrated in FIG. 2.

As is further illustrated in FIG. 2, in the memory module system 11 illustrated in FIG. 2—corresponding to conventional memory module systems—each DRAM 13a, 13b, 13c, 13d, 13e, 13f, 13g is, via a corresponding bus 17a, 17b, 17c, 17d, 17e, 17f, 17g, connected to the corresponding buffer 15a, 15b, 15c, 15d, 15e, 15f, 15g of the respective DIMM 12a, 12b, 12c, 12d, 12e, 12f, 12g.

Every buffer 15a, 15b, 15c, 15d, 15e, 15f, 15g knows its position in the above-mentioned tree structure. Which of the DIMMs 12a, 12b, 12c, 12d, 12e, 12f, 12g is just being addressed by the CPU/memory controller 14 may be determined in the respective buffer 15a, 15b, 15c, 15d, 15e, 15f, 15g e.g., by comparing identification data (ID number or slot number) stored in the corresponding buffer 15a, 15b, 15c, 15d, 15e, 15f, 15g with identification data sent by the CPU/memory controller 14 via the busses 16a, 16b, 16c, 16d, 16e, 16f, 16g and individually characterizing the respective buffer.

The respective ID number or slot number—to be stored in the respective buffer 15a, 15b, 15c, 15d, 15e, 15f, 15g—may be input via separate pins provided at the corresponding memory plug contact of the motherboard (e.g., three separate pins) in the DIMM 12a, 12b, 12c, 12d, 12e, 12f, 12g plugged into the respective plug contact—or its buffer 15a, 15b, 15c, 15d, 15e, 15f, 15g, respectively—, and be stored there (wherein, for instance, a 3-bit slot number 000 is assigned to the first DIMM 12a, a 3-bit slot number 001 to the second DIMM 12b, a 3-bit slot number 010 to the third DIMM 12b, etc., and is stored in the respective buffer 15a, 15b, 15c, 15d, 15e, 15f, 15g).

In the memory module system 11 with "tree" structure and seven connected DIMMs 12a, 12b, 12c, 12d, 12e, 12f, 12g illustrated in FIG. 2, ID numbers or slot numbers may be used as in the memory module system 1 with "daisy chain" structure and eight connected DIMMs (e.g., the slot numbers 000, 001, 010, 011, 100, 101, 110 (not, however—due to the minor number of DIMMs—e.g., the slot number 111)) illustrated in FIG. 1.

In the case of "tree" structure memory module systems with a correspondingly higher number of DIMMs (e.g., up to fifteen, or up to thirty-one DIMMs, see above), the slot number must include a correspondingly higher number of bits than indicated above, e.g., four or five bits (and the memory plug contacts of the motherboard must each include a correspondingly higher number of separate slot number pins).

The buffer of a respectively addressed DIMM 12a, 12b, 12c, 12d, 12e, 12f, 12g transmits the data, address, and/or control signals received via a corresponding "south-bound channel" of one of the busses 16a, 16b, 16c, 16d, 16e, 16f, 16g not just, as described above, to the corresponding buffers arranged in the next following logic level of the above-mentioned "tree" structure, but—possibly in a converted form—via the respective bus 17a, 17b, 17c, 17d, 17e, 17f, 17g also to the DRAMs 13a, 13b, 13c, 13d, 13e, 13f, 13g of the respectively addressed DIMM 12a, 12b, 12c, 12d, 12e, 12f, 12g.

Furthermore—in one embodiment during a read access—signals received by a corresponding buffer via the respective bus 17a, 17b, 17c, 17d, 17e, 17f, 17g from an addressed DRAM 13a, 13b, 13c, 13d, 13e, 13f, 13g are—possibly in a converted form—transmitted from the respective buffer via a corresponding "north-bound channel" of one of the busses 16a, 16b, 16c, 16d, 16e, 16f, 16g to the buffer arranged in the corresponding preceding logic level of the above-mentioned "tree" structure (or—from the buffer 15a of the first DIMM 12a—to the CPU/memory controller 14).

As results from FIGS. 1 and 2, substantially more DIMMs 12a, 12b, 12c, 12d, 12e, 12f, 12g can be connected to a memory module system that is constructed in "tree" structure in correspondence with the memory module system 11 illustrated in FIG. 2—with substantially identical delay or latency times—than with a memory module system that is constructed in "daisy chain" structure in correspondence with the memory module system 1 illustrated in FIG. 1 (the delay or latency times caused substantially by the buffers are namely, in the memory module system 11 with seven DIMMs 12a, 12b, 12c, 12d, 12e, 12f, 12g illustrated in FIG. 2, substantially identical to a memory module system with three connected DIMMs which is constructed in correspondence with the memory module system 1 illustrated in FIG. 1.

Vice versa, for a memory module system constructed in "tree" structure there result—with substantially equal DIMM number—considerably smaller delay or latency times than for a memory module system constructed in "daisy chain" structure.

Moreover, for the memory module system 11 constructed in "tree" structure and illustrated in FIG. 2, a constructed and operating memory controller 14 can be used as in the memory module system 1 constructed in "daisy chain" structure and illustrated in FIG. 1, i.e. a memory controller 14 that uses an access protocol as the memory controller 14 illustrated in FIG. 1.

Figure 3:
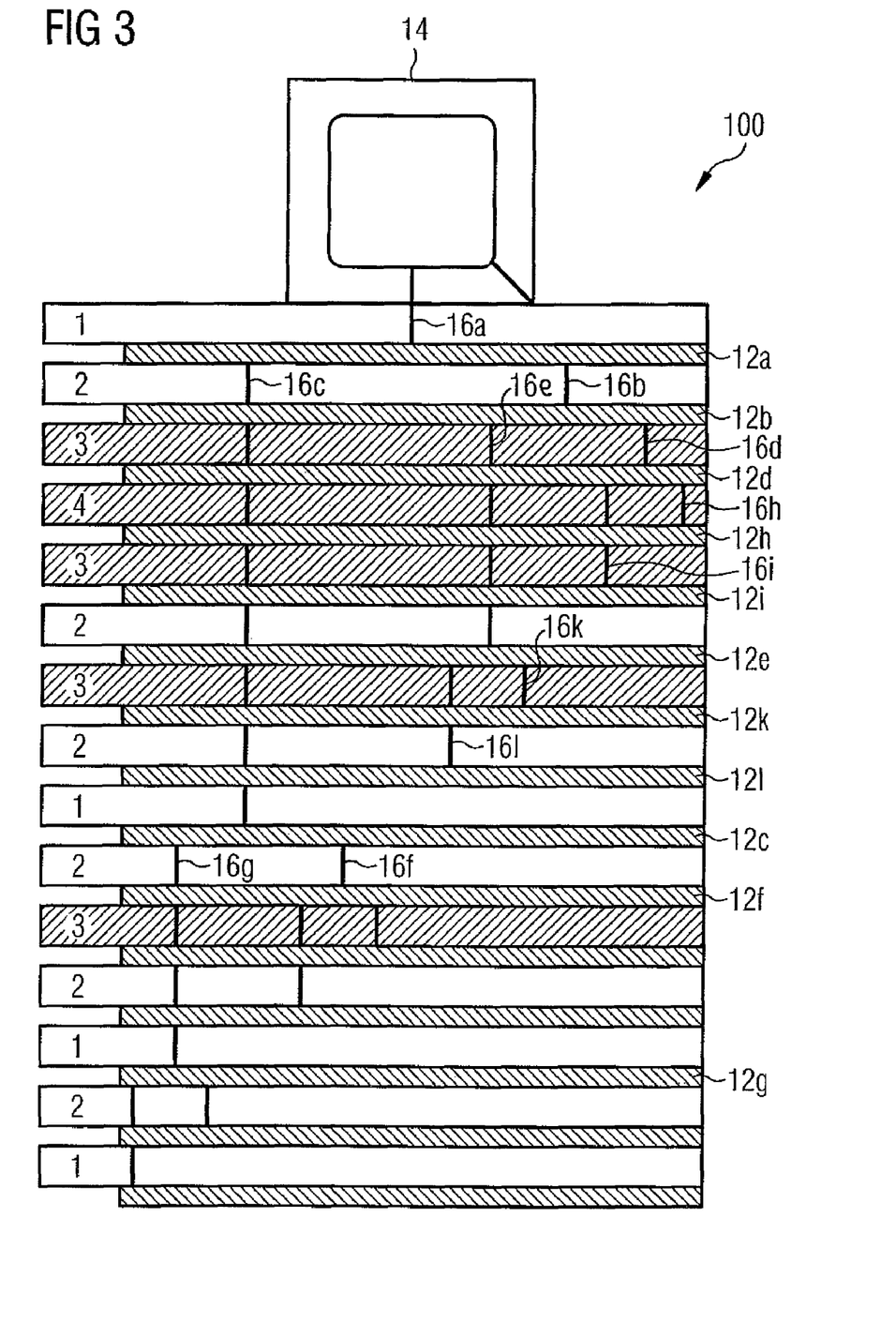
FIG. 3 illustrates a schematic representation of a motherboard with a memory module system according to a further embodiment

FIG. 3 illustrates a schematic representation of a motherboard 100 on which a memory module system constructed in "tree" structure is provided in accordance with a further embodiment.

The structure and function of the memory module system illustrated in FIG. 3 correspond to that of the memory module system 11 illustrated in FIG. 2 and explained in detail above, except that not, as illustrated in FIG. 2, seven, but fifteen DIMMs 12a, 12b, 12c, 12d, 12e, 12f, 12g, 12h, 12i, 12k, 12l may be connected to the corresponding memory controller 14.

As results from FIG. 3, the CPU/memory controller 14 is—corresponding to conventional memory module systems—connected to the first DIMM 12a (more exactly: its buffer) via a first bus 16a which includes a first channel ("south-bound channel" (SB channel)) and a second channel ("north-bound channel" (NB channel)).

As results further from FIG. 3, the first DIMM 12a (more exactly: its buffer) is—other than in conventional memory module systems—connected, via a second bus 16b, to the second DIMM 12b (more exactly: its buffer), and additionally via a third bus 16c—that is, in the illustration of FIG. 3, partially hidden by the DIMMs 12b, 12c etc. —to the third DIMM 12c (more exactly: its buffer).

The second DIMM 12b (more exactly: its buffer) is, via a fourth bus 16c, connected to the fourth DIMM 12d (more exactly: its buffer) and additionally via a fifth bus 16e—that is, in the illustration of FIG. 3, partially hidden by the DIMMs 12d etc. —to the fifth DIMM 12e (more exactly: its buffer).

In one embodiment, as the second DIMM 12b (more exactly: its buffer), the third DIMM 12c (more exactly: its buffer) is, via a sixth bus 16f, connected to the sixth DIMM 12f (more exactly: its buffer), and additionally via a seventh bus 16g to the seventh DIMM 12g (more exactly: its buffer).

Furthermore, the fourth, fifth, sixth, and seventh DIMMs 12d, 12e, 12f, 12g are, via corresponding further busses, each connected to two further DIMMs (e.g., the DIMM 12d via a first further bus 16h to the DIMM 12h, and via a second further bus 16i to the DIMM 12i, the DIMM 12e via a bus 16k to the DIMM 12k, and via a bus 16l to the DIMM 12l, etc., etc.).

The DIMMs 12a, 12b, 12c, 12d, 12e, 12f, 12g, 12h, 12i, 12k, 12l are each plugged into corresponding memory plug contacts of the motherboard 100.

The plug contacts—and thus also the DIMMs 12a, 12b, 12c, 12d, 12e, 12f, 12g, 12h, 12i, 12k, 12l plugged therein—are each oriented substantially parallel to each other (and substantially spaced equidistantly from each other).

As results from FIG. 3, in the embodiment illustrated there, the first DIMM 12a (which is positioned closest to the memory controller 14) is positioned next to the second DIMM 12b that is provided next to the fourth DIMM 12d that is arranged next to the eighth DIMM 12h, etc., etc.

The above-explained arrangement of the plug contacts or DIMMs 12a, 12b, 12c, 12d, 12e, 12f, 12g, 12h, 12i, 12k, 12l, respectively, on the motherboard 100 may result in respectively different line lengths and consequently in respectively different signal propagation delays with the different busses 16b, 16c, 16d, 16e, etc. provided on the motherboard 100.

Figure 4:
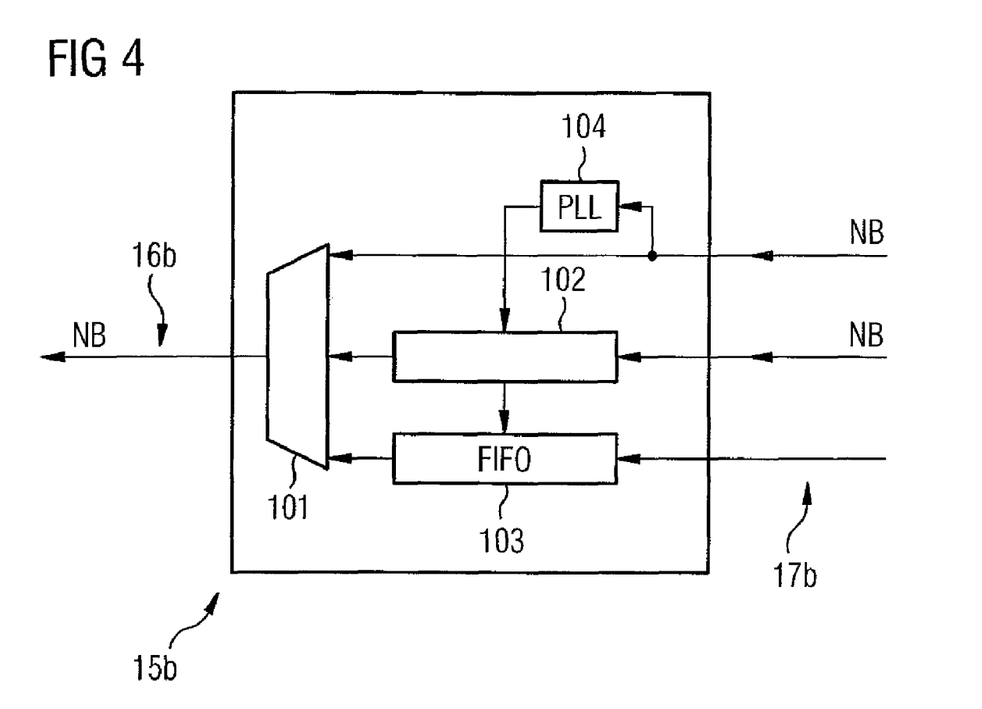
FIG. 4 illustrates a schematic detailed representation of a section of a buffer that can be used in the memory module systems illustrated in FIGS. 2 and 3.

FIG. 4 illustrates by way of example a schematic detailed representation of a section of a buffer that can be used in the memory module systems illustrated in FIGS. 2 and 3 (here: the buffer 15b provided on the second DIMM 12b).

As already explained above, the signals output by the buffer 15b via the "north-bound channel" of the second bus 16b may either be generated in reaction to signals received by the buffer 15b via the bus 17b from one of the DRAMs 13b of the second DIMM 12b (in one embodiment during a read access to the second DIMM 12b), or in reaction to signals received by the buffer 15b via the "north-bound channel" of the fourth bus 16d from the buffer 15d of the DIMM 12d (e.g., during an access to the DIMM 12d), or in reaction to signals received by the buffer 15b via the "north-bound channel" of the fifth bus 16e from the buffer 15e of the DIMM 12e (e.g., during an access to the DIMM 12e).

For selection of the respective signals to be transmitted, an appropriate multiplexer 101 may, for instance, be used, the output of which is connected with the "north-bound channel" of the second bus 16b.

The signals supplied to the buffer 15b via the above-mentioned bus 17b may be transmitted to a corresponding first input of the multiplexer 101 via a FIFO 103, the signals supplied to the buffer 15b via the "north-bound channel" of the fourth bus 16d to a second input of the multiplexer 101 via a delay line 102, and the signals supplied to the buffer 15b via the "north-bound channel" of the fifth bus 16e directly to a third input of the multiplexer 101.

For instance for the reasons explained further above, the signals supplied to the buffer 15b via the "north-bound channel" of the fifth bus 16e may be afflicted with a stronger delay than the signals supplied to the buffer 15b via the "north-bound channel" of the fourth bus 16d. These differences in the signal propagation delay may be compensated for with the delay line 102 provided between the "north-bound channel" of the fourth bus 16d and the second input of the multiplexer 101.

The signal delay caused by the delay line 102 may, for instance, be definitely set in a training operating phase of the DIMM 12b (in which the respective differences in the signal propagation delay are empirically determined for the "north-bound channels" of the fourth and fifth busses 16d, 16e) for a subsequent actual operating phase of the DIMM 12b.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A memory module system comprising:
   at least a first memory module, a second memory module, and a third memory module, each memory module including a plurality of semiconductor memory arrays for storing data;
   wherein the first memory module is connected with the second memory module via a first connection and with the third memory module via a second connection, and is configured such that data, address, and/or control signals received by the first memory module from a memory controller are transmitted from the first memory module to the second memory module via the first connection and from the first memory module to the third memory module via the second connection.

2. The memory module system of claim 1, comprising:
   a fourth memory module and a fifth memory module; and
   wherein the second memory module is connected with the fourth memory module via a third connection and with the fifth memory module via a fourth connection, and is configured such that the data, address, and/or control signals from the memory controller received by the second memory module from the first memory module via the first connection are transmitted from the second memory module to the fourth memory module via the third connection and from the second memory module to the fifth memory module via the fourth connection.

3. The memory module system of claim 2, comprising:
   a sixth memory module and a seventh memory module; and
   wherein the third memory module is connected with the sixth memory module via a fifth connection and with the seventh memory module via a sixth connection, and is configured such that the data, address, and/or control signals from the memory controller received by the third memory module from the first memory module via the second connection are transmitted from the third memory module to the sixth memory module via the fifth connection and from the third memory module to the seventh memory module via the sixth connection.

4. The memory module system of claim 3, wherein the first memory module comprises a buffer device for receiving the data, address, and/or control signals, and for transmitting the data, address, and/or control signals to the second and third memory modules.

5. The memory module system of claim 4, wherein the second memory module comprises a buffer device for receiving the data, address, and/or control signals from the first memory module, and for transmitting the data, address, and/or control signals to the fourth and fifth memory modules.

6. The memory module system of claim 5, wherein the third memory module comprises a buffer device for receiving the data, address, and/or control signals from the first memory module, and for transmitting the data, address, and/or control signals to the sixth and seventh memory modules.

7. The memory module system of claim 2, comprising a first and a second further memory module, wherein the fourth memory module is connected with the first further memory module via a first further connection and with the second further memory module via a second further connection.

8. The memory module system of claim 7, which additionally comprises a third and a fourth further memory module, wherein the fifth memory module is connected with the third further memory module via a third further connection and with the fourth further memory module via a fourth further connection.

9. The memory module system of claim 1, wherein the semiconductor memory arrays comprise random access memory arrays.

10. The memory module system of claim 9, wherein the semiconductor arrays comprise dynamic random access memory arrays.

11. The memory module system of claim 1, comprising wherein the first memory module transmits the received data, address, and/or control signals to the second and third memory modules irrespective of whether the first, the second, or the third memory module is addressed with the signals.

12. A memory system comprising:
    a first memory module configured such that data, address, and/or control signals received by the first memory module from a memory controller via a controller connection are transmitted from the first memory module via a first connection to a second memory module and from the first memory module via a second connection to a third memory module irrespective of whether the first memory module, or the second memory module, or the third memory module is addressed with the signals, each memory module including a plurality of semiconductor memory arrays for storing data.

13. The system of claim 12, wherein the first memory module includes a buffer device for receiving the data, address, and/or control signals from the memory controller, and for transmitting the data, address, and/or control signals to the second and third memory modules.

14. The system of claim 13, comprising wherein a signal regeneration is performed by the buffer device prior to the transmission of the data, address, and/or control signals.

15. The system of claim 12, wherein the semiconductor memory arrays comprise random access memory arrays.

16. The system of claim 12, wherein the semiconductor memory arrays comprise dynamic random access memory arrays.

17. The system according of claim 12, wherein the system is configured such that the data, address, and/or control signals received by the first memory module are additionally transmitted from the first memory module to a fourth memory module via a third connection.

18. A method for operating a memory module, the method comprising:
receiving data, address, and/or control signals with a first memory module; and
transmitting the data, address, and/or control signals from the first memory module via a first connection to a second memory module and from the first memory module via a second connection to a third memory module, irrespective of whether the first memory module, or the second, or the third memory module is addressed with the signals, each memory module including a plurality of random access memory arrays for storing data.

19. The method of claim 18, further comprising the first memory module performing a signal regeneration prior to the transmission of the data, address, and/or control signals.

20. A system comprising:
a memory module printed circuit board comprising at least a first, a second, a third, a fourth, and a fifth plug contact for incorporating a first, a second, a third, a fourth, and a fifth memory module, each memory module having a plurality of random access memory arrays for storing data, wherein the first plug contact is connected with the second plug contact via a first data, address, and/or control signal connection and via a second data, address, and/or control signal connection with the third plug contact, and wherein the second plug contact is connected with the fourth plug contact via a third data, address, and/or control signal connection and via a fourth data, address, and/or control signal connection with the fifth plug contact.

21. The system of claim 20, comprising a sixth and a seventh plug contact for incorporating a sixth and a seventh memory module, each memory module including a plurality of random access memory arrays for storing data, and wherein the third plug contact is connected with the sixth plug contact via a fifth data, address, and/or control signal connection and with the seventh plug contact via a sixth data, address, and/or control signal connection.

* * * * *